US007363978B2

(12) United States Patent
Welton et al.

(10) Patent No.: US 7,363,978 B2
(45) Date of Patent: Apr. 29, 2008

(54) METHODS OF USING REACTIVE SURFACTANTS IN SUBTERRANEAN OPERATIONS

(75) Inventors: Thomas D. Welton, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 213 days.

(21) Appl. No.: 11/251,493

(22) Filed: Oct. 14, 2005

(65) Prior Publication Data
US 2006/0260813 A1 Nov. 23, 2006

Related U.S. Application Data

(63) Continuation-in-part of application No. 11/133,554, filed on May 20, 2005, and a continuation-in-part of application No. 11/133,697, filed on May 20, 2005, now abandoned.

(51) Int. Cl.
E21B 33/138 (2006.01)
E21B 43/22 (2006.01)

(52) U.S. Cl. .................. 166/295; 166/280.1; 166/294; 166/300; 166/305.1; 507/219; 507/220; 507/224; 507/260

(58) Field of Classification Search ................. 166/271
See application file for complete search history.

(56) References Cited

U.S. PATENT DOCUMENTS

| 3,163,212 A * | 12/1964 | Bernard ...................... 166/271 |
| 3,343,599 A * | 9/1967 | Eddins, Jr. et al. .......... 166/294 |
| 3,437,145 A | 4/1969 | Johnson et al. .............. 166/295 |
| 3,438,443 A | 4/1969 | Prats et al. .................. 166/303 |
| 3,443,637 A | 5/1969 | Sparlin et al. ............... 166/295 |
| 3,541,138 A | 11/1970 | Emmons et al. ............. 560/195 |
| 3,815,680 A * | 6/1974 | McGuire et al. ............. 166/281 |
| 4,074,536 A * | 2/1978 | Young ........................ 405/264 |
| 4,075,411 A | 2/1978 | Dickstein .................... 560/224 |
| 4,224,455 A | 9/1980 | Deutsch ...................... 560/193 |
| 4,246,387 A | 1/1981 | Deutsch ...................... 526/209 |
| 4,323,124 A * | 4/1982 | Swan .......................... 166/303 |
| 4,337,185 A | 6/1982 | Wessling et al. ............. 524/458 |
| 4,425,384 A | 1/1984 | Brownscombe .............. 427/221 |
| 4,426,489 A | 1/1984 | Wessling et al. ............. 524/815 |
| 4,432,881 A * | 2/1984 | Evani .......................... 507/121 |
| 4,475,595 A | 10/1984 | Watkins et al. .............. 166/303 |
| 4,572,296 A | 2/1986 | Watkins ....................... 166/303 |
| 4,579,176 A | 4/1986 | Davies et al. ................ 166/303 |
| 4,582,137 A * | 4/1986 | Schmitt ..................... 166/270.1 |
| 4,606,227 A | 8/1986 | Walters ........................ 73/432 |
| 4,611,087 A | 9/1986 | Yamashita et al. ............. 560/81 |
| 4,681,854 A | 7/1987 | Feazel ......................... 436/31 |
| 4,814,096 A * | 3/1989 | Evani .......................... 507/224 |
| 4,814,514 A | 3/1989 | Yokota et al. ................ 568/608 |
| 4,898,750 A | 2/1990 | Friedman et al. ............ 427/221 |
| 4,913,236 A | 4/1990 | Reed ........................... 166/303 |
| 4,918,211 A | 4/1990 | Yokota et al. ................. 558/31 |
| 4,922,758 A | 5/1990 | Penny ........................... 73/38 |
| 4,997,582 A * | 3/1991 | Clark et al. .................. 507/225 |
| 5,206,286 A | 4/1993 | Swarup et al. .............. 524/761 |
| 5,240,075 A | 8/1993 | Burrows et al. ............. 166/303 |
| 5,249,627 A | 10/1993 | Harms et al. ................ 166/308 |
| 5,324,862 A | 6/1994 | Yokota et al. ............... 568/608 |
| 5,332,854 A | 7/1994 | Yokota et al. ................ 558/33 |
| 5,393,439 A | 2/1995 | Laramay et al. ............. 507/211 |
| 5,478,883 A | 12/1995 | Anchor et al. .............. 524/812 |
| 5,582,249 A | 12/1996 | Caveny et al. .............. 166/276 |
| 5,721,313 A * | 2/1998 | Yeung et al. ................ 524/814 |
| 5,775,425 A | 7/1998 | Weaver et al. .............. 166/276 |
| 5,787,986 A | 8/1998 | Weaver et al. .............. 166/280 |
| 5,833,000 A | 11/1998 | Weaver et al. .............. 166/276 |
| 5,839,510 A | 11/1998 | Weaver et al. .............. 166/276 |
| 5,853,048 A * | 12/1998 | Weaver et al. .............. 166/279 |
| 5,867,549 A | 2/1999 | Lindquist et al. ........... 376/306 |
| 5,924,488 A | 7/1999 | Nguyen et al. .............. 166/280 |
| 6,047,772 A | 4/2000 | Weaver et al. .............. 166/276 |
| 6,239,240 B1 | 5/2001 | Schultz et al. .............. 526/277 |
| 6,242,526 B1 | 6/2001 | Siddiqui et al. ............. 524/555 |
| 6,311,773 B1 | 11/2001 | Todd et al. ............... 166/280.2 |
| 6,439,309 B1 * | 8/2002 | Matherly et al. ............ 166/276 |
| 6,506,804 B2 | 1/2003 | Schultz ........................ 516/59 |
| 6,534,597 B2 | 3/2003 | Adam et al. ................. 525/340 |

(Continued)

FOREIGN PATENT DOCUMENTS

EP 1100325 A1 7/1999

(Continued)

OTHER PUBLICATIONS

U.S. Appl. No. 10/864,618, filed Jun. 9, 2004, Blauch et al.

(Continued)

Primary Examiner—George Suchfield
(74) Attorney, Agent, or Firm—Robert A. Kent; Baker Botts, L.L.P.

(57) ABSTRACT

Novel uses of reactive surfactants in treating subterranean formations and/or proppant particulates are provided. In one embodiment, the present invention provides a method comprising: providing a treatment fluid that comprises a base fluid and a reactive surfactant; introducing the treatment fluid into a subterranean formation; and allowing the reactive surfactant to interact with a surface in the subterranean formation.

8 Claims, No Drawings

U.S. PATENT DOCUMENTS

| | | | |
|---|---|---|---|
| 6,649,718 B2 | 11/2003 | Nishitani et al. | 526/240 |
| 6,660,693 B2 | 12/2003 | Miller et al. | 507/136 |
| 6,729,408 B2 | 5/2004 | Hinkel et al. | 166/308 |
| 6,841,655 B1 | 1/2005 | Gota et al. | 528/425 |
| 6,920,928 B1* | 7/2005 | Davies et al. | 166/279 |
| 7,040,403 B2* | 5/2006 | Nguyen et al. | 166/281 |
| 2003/0181574 A1 | 9/2003 | Adam et al. | 524/505 |
| 2003/0188872 A1 | 10/2003 | Nguyen et al. | 166/308 |
| 2004/0048963 A1 | 3/2004 | Sawada et al. | 524/423 |
| 2004/0197357 A1 | 10/2004 | Heming et al. | 424/401 |
| 2004/0242447 A1 | 12/2004 | Toru et al. | 510/175 |
| 2005/0049151 A1 | 3/2005 | Nguyen et al. | 507/203 |
| 2005/0070679 A1 | 3/2005 | Breuer et al. | 526/317.1 |
| 2005/0079981 A1 | 4/2005 | Nguyen et al. | 507/200 |
| 2005/0092489 A1* | 5/2005 | Welton et al. | 166/280.2 |
| 2005/0107263 A1* | 5/2005 | Bland et al. | 507/203 |
| 2007/0079965 A1* | 4/2007 | Nguyen et al. | 166/279 |

FOREIGN PATENT DOCUMENTS

| | | |
|---|---|---|
| EP | 1129770 B1 | 2/2001 |
| JP | 58203960 A | 5/1982 |
| JP | 60078947 A | 10/1983 |
| JP | 63091130 A | 10/1986 |
| JP | 63274443 A | 5/1987 |
| JP | 02111427 A | 10/1988 |
| JP | 03012228 A | 6/1989 |
| JP | 08041112 A | 7/1994 |
| JP | 08041113 A | 7/1994 |
| JP | 09291063 A | 4/1996 |
| JP | 10245370 A | 3/1997 |
| JP | 11029547 A | 7/1997 |
| JP | 11309361 A | 4/1998 |
| JP | 2000344805 A | 6/1999 |
| JP | 2000354752 A | 6/1999 |
| JP | 2001002714 A | 6/1999 |
| JP | 2001120978 A | 10/1999 |
| JP | 2001310906 A | 4/2000 |
| JP | 2002088104 A | 9/2000 |
| JP | 2002105108 A | 10/2000 |
| JP | 2002265505 A | 3/2001 |
| JP | 2002275115 A | 3/2001 |
| JP | 2003064109 A | 9/2001 |
| JP | 2003144898 A | 11/2001 |
| JP | 2003261605 A | 3/2002 |
| JP | 2004277683 A | 3/2003 |
| JP | 2004331765 A | 5/2003 |
| WO | WO 00/06611 | 7/1999 |
| WO | WO0119507 A1 | 8/2000 |
| WO | WO 03/015523 A2 | 2/2003 |
| WO | WO 03/097996 A1 | 11/2003 |
| WO | WO 2004/096940 A1 | 11/2004 |

OTHER PUBLICATIONS

U.S. Appl. No. 10/864,061, filed Jun. 9, 2004, Blauch et al.
U.S. Appl. No. 11/251,491, filed Oct. 14, 2005, Welton et al.
U.S. Appl. No. 11/776,956, filed Jul. 12, 2007, Weaver et al.
Non-Final Office Action (U.S. Appl. No. 11/133,554), Apr. 12, 2007.
Final Office Action (U.S. Appl. No. 11/133,554), Aug. 13, 2007.
Advisory Action Before Filing of an Appeal Brief (U.S. Appl. No. 11/133,554), Oct. 22, 2007.
Non-Final Office Action (U.S. Appl. No. 11/133,697), Apr. 12, 2007.
Notice of Abandonment (U.S. Appl. No. 11/133,697), Nov. 2, 2007.
Foreign communication related to a counterpart application, Aug. 28, 2006.

* cited by examiner

METHODS OF USING REACTIVE SURFACTANTS IN SUBTERRANEAN OPERATIONS

CROSS-REFERENCE TO RELATED APPLICATIONS

This application is a continuation-in-part of U.S. patent application Ser. No. 11/133,554, entitled "Methods of Modifying Fracture Faces and Other Surfaces in Subterranean Formations," filed on May 20, 2005 by Weaver et al., and U.S. patent application Ser. No. 11/133,697, entitled "Methods of Treating Particulates and Use in Subterranean Formations," filed on May 20, 2005, now abandoned by Weaver et al., the entireties of which are herein incorporated by reference for all purposes. The present invention is related to co-pending U.S. application Ser. No. 11/251,491, entitled "Methods of Using Reactive Surfactants in Subterranean Operations," filed concurrently herewith, the entire disclosure of which is incorporated herein by reference.

BACKGROUND

The present invention relates to methods and compositions useful in subterranean operations, and more particularly, to novel uses of reactive surfactants in treating subterranean formations and/or proppant particulates.

Hydrocarbon wells are often located in subterranean formations that contain unconsolidated particulates (e.g., sand, gravel, proppant, fines, etc.) that may migrate out of the subterranean formation into a well bore and/or may be produced with the oil, gas, water, and/or other fluids produced by the well. The term "unconsolidated particulates," and derivatives thereof, is defined herein to include loose particulates and particulates bonded with insufficient bond strength to withstand the forces created by the flow of fluids through the formation. Unconsolidated particulates may comprise, among other things, sand, gravel, fines, and/or proppant particulates in the subterranean formation, for example, proppant particulates placed in the subterranean formation in the course of a fracturing operation, among other purposes, to hold open conductive fractures created in that operation (e.g., forming a "proppant pack" within the fracture).

The presence of unconsolidated particulates in produced fluids may be undesirable in that, among other problems, the particulates may abrade pumping and other producing equipment and/or reduce the production of desired fluids from the well. Moreover, particulates that have migrated into a well bore, among other things, may clog portions of the well bore and/or a proppant pack, reducing the conductivity of the subterranean formation (i.e., the ability of fluids to flow through the formation).

Several different treatments are used in the art to control the migration of unconsolidated particulates in subterranean formations. As used herein, the term "treatment," or "treated," refers to any operation performed in conjunction with a desired function and/or for a desired purpose. The term "treatment," or "treated," does not imply any particular action. One such method involves placing a filtration bed containing gravel (e.g., a "gravel pack") near the well bore to present a physical barrier to the transport of unconsolidated particulates with the production of desired fluids. Typically, such "gravel-packing operations" involve the pumping and placement of a quantity of certain particulate, into the unconsolidated subterranean formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. To install the gravel pack, the gravel is carried to the formation in the form of a slurry by mixing the gravel with a viscous treatment fluid. Once the gravel is placed in the well bore, the viscosity of the treatment fluid is reduced, and it is returned to the surface. The resulting structure presents a barrier to migrating sand from the formation while still permitting fluid flow. However, the use of gravel packs and/or screens may exhibit problems such as screen plugging and screen erosion, or may be time-consuming and expensive to install.

Other methods used to control unconsolidated particulates in subterranean formations involve consolidating unconsolidated particulates into stable, permeable masses by applying a resin or a tackifying agent to the subterranean formation. The terms "consolidate," "consolidating," and derivatives thereof, are defined herein to include any process of stabilizing a portion of a subterranean formation, which may, at least in part, stabilize unconsolidated particulates such that they are bonded with sufficient bond strength to withstand the forces created by the flow of fluids through the formation and/or prevented from shifting or migrating. The particulates in these stable, permeable masses may be bonded with sufficient bond strength to withstand the forces created by the flow of fluids through the formation and/or prevented from shifting or migrating, but may still permit the flow of fluid(s) through the pore spaces of the mass. However, the use of conventional resins and tackifying agents may be problematic. For example, these treatments may require applying several different components (e.g., preflush fluids, afterflush fluids, catalysts, and the like) to the subterranean formation, which may add cost and complexity to the operation and/or require longer periods of time. Also, conventional multi-component treatments may not be practical due to the difficulty in determining if the entire interval has been treated with all of the components used.

Surfactants have been used heretofore in the art for many purposes, including stabilizing foams or emulsions, changing the wettability of surfaces, solubilizing certain materials, dewatering fluids, reducing the surface tension of fluids, increasing the viscosity of fluids, enhancing viscoelastic and rheological properties of fluids, and/or aiding in the placement of treatment fluids in subterranean formations. However, in some instances, conventional surfactants may destabilize a coating (e.g., resin or tackifying agent) on a surface within a subterranean formation or a surface of a proppant particulate, for example, by forming surfactant micelles within the coating and/or making the coating less dense. In other instances, it may be desirable to deposit molecules of a surfactant on a surface within a subterranean formation and/or a surface of a proppant particulate, for example, when the proppant particulate is to be treated with certain aqueous tackifying agents. However, molecules of conventional surfactants may not distribute themselves evenly along the coating, which may leave certain portions of a subterranean formation or a proppant particulate insufficiently treated with the surfactant for particular subterranean operations.

SUMMARY

The present invention relates to methods and compositions useful in subterranean operations, and more particularly, to novel uses of reactive surfactants in treating subterranean formations and/or proppant particulates.

In one embodiment, the present invention provides a method comprising: providing a treatment fluid that comprises a base fluid and a reactive surfactant; introducing the treatment fluid into a subterranean formation; and allowing the reactive surfactant to interact with a surface in the subterranean formation.

In another embodiment, the present invention provides a method comprising: providing a treatment fluid that comprises a base fluid, and a proppant particulate that comprises at least one surface that has been allowed to interact with a reactive surfactant; and introducing the treatment fluid into a subterranean formation.

In another embodiment, the present invention provides a method comprising: providing a proppant particulate; providing a reactive surfactant; and allowing the reactive surfactant to interact with a surface of the proppant particulate.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions useful in subterranean operations, and more particularly, to novel uses of reactive surfactants in treating subterranean formations and/or proppant particulates.

The methods, treatment fluids, and surfactant-treated proppant particulates of the present invention generally involve the use of a reactive surfactant. The term "reactive surfactant" is defined herein to include any surfactant whose molecules are capable of forming polymers, copolymers or crosslinks with itself or with other molecules. In certain embodiments of the present invention, the reactive surfactant is allowed to interact with a surface in a subterranean formation (e.g., a fracture face), a wellbore wall, or a particulate (e.g., sand, gravel, fines, proppant particulates, etc.) being treated. The term "interact with a surface," as used herein, does not imply any particular action, and is defined herein to include any number of different chemical and/or mechanical interactions between the reactive surfactant and the surface being treated. For example, the reactive surfactant may form a "coating" on the surface being treated, which is defined herein to include any film or layer that covers some portion of the surface. In certain embodiments, the reactive surfactant may become absorbed into the surface being treated (or some other coating thereon). In certain embodiments, at least some portion of the reactive surfactant may reside on a surface of a proppant particulate that has been allowed to interact with a reactive surfactant. The results of this interaction may, inter alia, help "consolidate" unconsolidated particulates, as that term is defined herein, (e.g., by forming a tacky or curable coating that causes unconsolidated particulates to adhere to each other), modify the hydrophobicity or hydrophilicity of the surface, provide a site for subsequent reaction with one or more compounds, and/or maintain the conductivity of a subterranean formation, gravel pack, and/or proppant pack. Among other things, this coating may exhibit greater colloidal stability and/or comprise more densely packed polymer molecules than coatings generated using conventional materials. Moreover, the molecules of the reactive surfactants used in the present invention may distribute themselves more evenly along the surfaces treated herein than molecules of a conventional surfactant, which may create a more uniform and/or more stable coating.

The reactive surfactants suitable for use in the present invention comprise any surfactant whose molecules are capable of forming polymers, copolymers, or crosslinks with itself or with other molecules. Examples of reactive surfactants that may be suitable for use in the present invention include, but are not limited to the following: diallyl amine pluronics; linoieic alcohols; allyl alkyl phenols; acrylate derivatives; allyl alcohol alkenyl anhydride derivatives; maleic derivatives; sulfosuccinate derivatives; allyl amine salts; polymerizable esters (e.g., olefinically unsaturated esters, alkenylsuccinic monoesters); ethylenically unsaturated amine salts of sulfonic, phosphoric and carboxylic acids; alpha-beta ethylenically unsaturated poly(alkylenoxy) compounds; ring sulfonated maleate half esters of alkoxylated alkyl arylols; ring sulfonated half esters of maleic anhydride with alkoxylated alkyl arylols; aliphatic diols; polyoxyalkylene alkyl ethers; and mixtures thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

Certain reactive surfactants that may be suitable for use in the present invention may comprise at least one branched aliphatic hydrocarbon group or branched aliphatic acyl group. Certain reactive surfactants that may be suitable for use in the present invention may comprise unsaturated compounds having a pentenyl group to which an alkylene oxide is added. Certain reactive surfactants that may be suitable for use in the present invention may comprise polyhydroxyl functional non-ionic surfactants having repeating polymer units in the backbone and from 3 to 31 hydroxyl groups wherein the hydroxyl groups on the repeating polymer unit are separated by 4 or more carbon atoms wherein the reactive surfactant is substantially free of oxyethylene units. Certain reactive surfactants that may be suitable for use in the present invention may comprise substantially linear synthetic water-soluble surfactants whose polymeric backbones are derived from the polymerization of one or more ethylenically unsaturated monomers and have an average molecular weight of from about 500 to about 40,000. Certain reactive surfactants that may be suitable for use in the present invention may comprise polymerizable surfactants formed by the reaction of a diallylamine, ethylene oxide, propylene oxide, and/or butylene oxide. Certain reactive surfactants that may be suitable for use in the present invention may comprise ethylenically unsaturated polymerizable water-soluble nonionic surfactants formed by the reaction of a diallylamine compound with ethylene oxide, propylene oxide, or butylene oxide in an emulsion polymerization reaction. Certain reactive surfactants that may be suitable for use in the present invention may comprise one or more polymerizable antimicrobial quaternary ammonium compounds derived from at least one acid, wherein the acid is a sulfonic acid, a carboxylic acid, a phosphoric acid, or a salt therof, wherein the acid (or salt thereof) comprises at least one ethylenically unsaturated portion. Another type of reactive surfactant that may be suitable for use in the present invention are amine salts comprising: (a) at least one acid that is a sulfonic acid, a carboxylic acid, or a phosphoric acid, or a mixture thereof; and (b) at least one nitrogenous base that comprises at least one nitrogen atom and at least one ethylenically unsaturated portion. Another type of reactive surfactant that may be suitable for use in the present invention are esters of acrylic, methacrylic, and crotonic acids and the mono- and di-esters of maleic, flumaric, itaconic, and aconitic acids with one or more of the following: (a) $C_8$-$C_{20}$ alkylphenoxy(ethyleneoxy)$_{10-60}$ ethyl alcohol; (b) (ethyleneoxy)$_{15-25}$ sorbitan esters of $C_{12}$-$C_{20}$ fatty acids; or (c) methyl cellulose, hydroxymethyl cellulose, hydroxyethyl cellulose, and polyvinyl alcohol.

One type of reactive surfactant that may be suitable for use in the present invention are reactive surfactants that comprise: (a) one anionic hydrophilic group; and (b) one reactive group selected from the group of a vinyl group, an allyl group, and groups having formula (1) below:

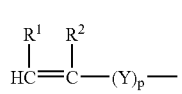

(1)

wherein $R^1$ and $R^2$ are each a hydrogen atom or $CH_2X$ (wherein X is a hydrogen atom or a substituent), Y is a carbonyl group or methylene group, and p is a number equal to zero or 1.

Another type of reactive surfactant that may be suitable for use in the present invention are phosphoric esters having formula (2) below:

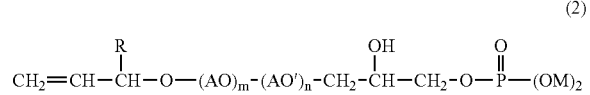

(2)

wherein: R is a hydrogen atom or a methyl group; AO is a $C_6$-$C_{18}$ oxyalkylene group or oxy(alkoxymethyl)ethylene group; AO' is a $C_2$-$C_4$ oxyalkylene group; M is a hydrogen atom, an alkali metal atom, or ammonium; m is a number equal to 0 or from 1 to 3; and n is a number from 1 to 100.

Another type of reactive surfactant that may be suitable for use in the present invention are sulfate surfactants having formula (3) below:

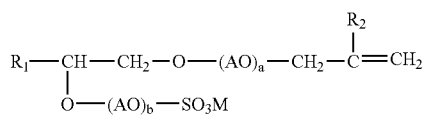

(3)

wherein: $R_1$ is a $C_6$-$C_{22}$ alkyl group; $R_2$ is a hydrogen atom or a methyl group; A is an ethylene group and/or a propylene group; a is an integer from 1 to 20; b is 0 or an integer from 1 to 20; and M is a hydrogen atom, an alkali metal atom, an alkaline earth metal atom, ammonium, a residual group of an alkyl amine, or a residual group of an alkanolamine.

Another type of reactive surfactant that may be suitable for use in the present invention are surfactants having formula (4) or (5) below:

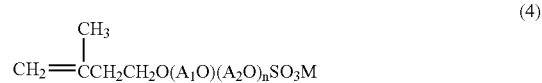

wherein: $A_1$ is a $C_5$-$C_{18}$ alkylene group or an alkoxymethylethylene group (whose alkoxy group has 4-18 carbon atoms); $A_2$ is a $C_2$-$C_4$ alkylene group; n is a number from 0 to 200; and M is a cation.

Another type of reactive surfactant that may be suitable for use in the present invention are surfactants having formula (6) below:

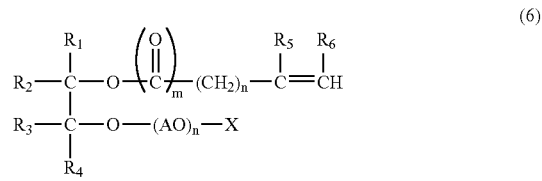

wherein: n and m are each any number; X denotes a methylene group or carbonyl group; AO is an oxyalkylene group or oxy(alkoxymethyl)ethylene group; and $R_1$-$R_6$ are each alkyl groups. Reactive surfactants of this type comprise at least one substituted or unsubstituted aryl cyclic sulfonium zwitterion groups in the molecules of the reactive surfactant.

Another type of reactive surfactant that may be suitable for use in the present invention are surfactants having formula (7) below:

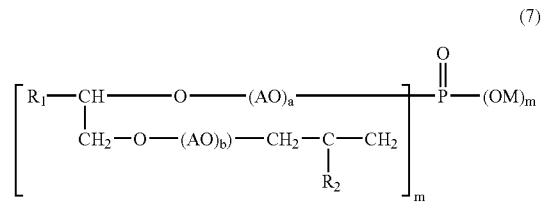

wherein: a, b, and m are each any number; AO is an oxyalkylene group or oxy(alkoxymethyl)ethylene group; and M is a hydrogen atom, an alkali metal atom, an alkaline earth metal atom, ammonium, a residual group of an alkyl amine, or a residual group of an alkanolamine. Reactive surfactants of this type comprise both a long-chain alkyl group and a polymerizable reactive group having a hydrophilic polyoxyalkylene chain.

Another type of reactive surfactant that may be suitable for use in the present invention are surfactants having formula (8) and/or (9) below:

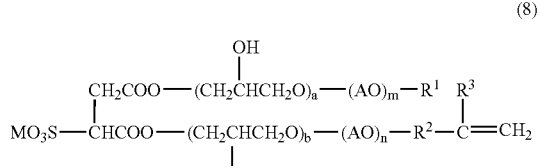
(8)

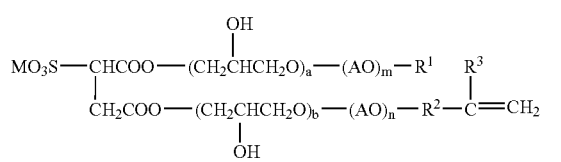
(9)

wherein: $R^1$ is a branched aliphatic hydrocarbyl group or a secondary aliphatic hydrocarbyl group; $R^2$ is an alkylene group; $R^3$ is a hydrogenator or a methyl group; AO and AO' are each a $C_2$-$C_4$ oxyalkylene group; M is a hydrogen atom, an alkali metal, an alkaline earth metal, or an ammonium; m and n are each a number from 0 to 100; and a and b are each a number equal to 0 or 1.

Another type of reactive surfactant that may be suitable for use in the present invention are surfactants prepared by formulating a phosphoric ester-type reactive surfactant having formula (10) below with a sulfuric ester-type surfactant having formula (11) below in a prescribed ratio:

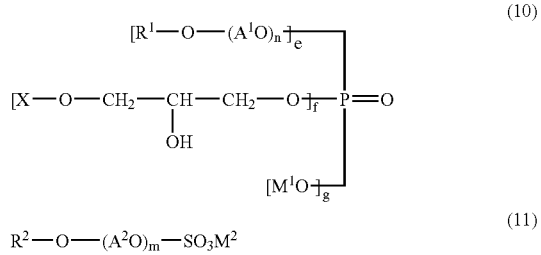
(10)

$$R^2\text{—}O\text{—}(A^2O)_m\text{—}SO_3M^2 \quad (11)$$

wherein: $A^1$ is a $C_5$-$C_{18}$ alkylene group or an alkoxymethylethylene group (whose alkoxy group has 4-18 carbon atoms); $A^2$ is a $C_2$-$C_4$ alkylene group; X denotes a methylene group or a carbonyl group; $M^1$ and $M^2$ are each a hydrogen atom, an alkali metal atom, an alkaline earth metal atom, ammonium, a residual group of an alkyl amine, or a residual group of an alkanolamine; and e, f, g, m, and n are each any number. Another type of reactive surfactant that may be suitable for use in the present invention are unsaturated compounds having formula (12) below:

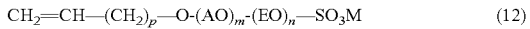
(12)

wherein: AO is a $C_3$-$C_{18}$ oxyalkylene group; EO is oxyethylene group; p is a number from 2 to 16; m is a number from 0 to 50; n is a number from 0 to 200; and M is a hydrogen atom or a cation.

Another type of reactive surfactant that may be suitable for use in the present invention are surfactants prepared from a partially sulfated phosphate ester reactive surface active agent having formula (13) below:

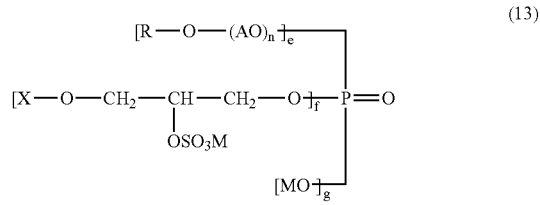
(13)

wherein: e, f, g, and n are each any number; AO is an oxyalkylene group or an oxy(alkoxymethyl)ethylene group; X denotes a methylene group or a carbonyl group; and M is a hydrogen atom, an alkali metal atom, an alkaline earth metal atom, ammonium, a residual group of an alkyl amine, or a residual group of an alkanolamine.

Another type of reactive surfactant that may be suitable for use in the present invention are phosphate-type surfactants having formula (14) below:

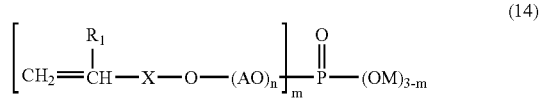
(14)

wherein: $R_1$ denotes a hydrogen atom or a methyl group; X denotes a methylene group or a carbonyl group; (AO) denotes a polyoxyalkyene group; M denotes a hydrogen atom, a metal atom, or ammonium; m denotes a number equal to 1 or 2; and n denotes a number greater than or equal to 1.

Another type of reactive surfactant that may be suitable for use in the present invention are surfactants having formula (15) below:

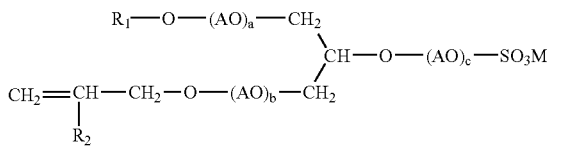
(15)

wherein: $R_1$ is a $C_6$-$C_{30}$ hydrocarbon group; $R_2$ is a hydrogen atom or a methyl group; A is a $C_2$ or $C_3$ alkylene group; a is equal to 0 or an integer from 1 to 15; b is an integer from 1 to 15; c is equal to 0 or an integer from 1 to 20; and M is a hydrogen atom, an alkali neutralized salt or ammonium of an amine.

Another type of reactive surfactant that may be suitable for use in the present invention are surfactants having formula (16) below:

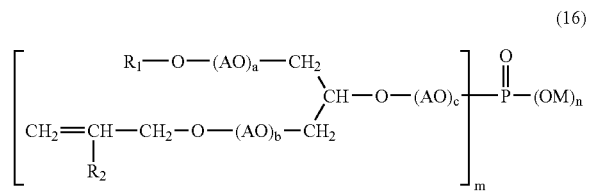
(16)

wherein: $R_1$ is a $C_6$-$C_{30}$ hydrocarbon; $R_2$ is a hydrogen atom or a methyl group; A is an ethylene or propylene group; a is equal to 0 or an integer from 1 to 15; b is an integer from 1 to 15; c is equal to 0 or an integer from 1 to 20; n is equal to 1 or 2; the sum of m and n is equal to 3; and M is a hydrogen atom, an alkyl metal atom, or an alkaline earth metal.

Another type of reactive surfactant that may be suitable for use in the present invention are phosphates (or alkali metal salts, alkaline earth metal salts, alkanolamine salts, or ammonium salts thereof) having formula (17) below:

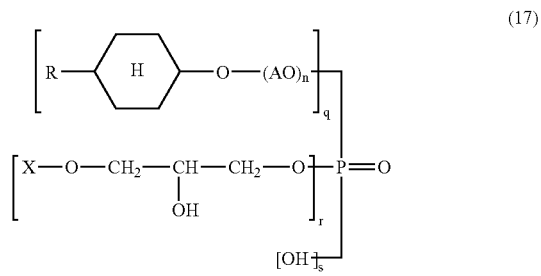
(17)

wherein: R is a $C_6$-$C_{12}$ alkyl group; A is an ethylene group or a propylene group (with the proviso that all the A's cannot be propylene groups); n is an integer from 1 to 50; q is equal to 1 or 2; r is equal to 1 or 2; s is equal to 0 or 1; the sum of q, r, and s is equal to 3; and X is a methacryloyl group, an acryloyl group, or an allyl group. Reactive surfactants of this type can be obtained by reacting a glycidyl compound (e.g., an acrylic glycidyl ester or allyl glycidyl ether) with a phosphate compound obtained by reacting a polyoxyalkylene alkylcyclohexyl ether with a phosphorylating agent e.g., phosphoric anhydride).

Another type of reactive surfactant that may be suitable for use in the present invention are surfactants having formula (18) below:

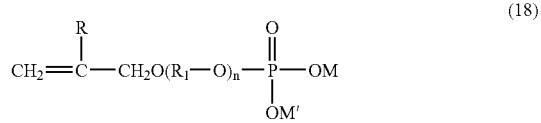
(18)

wherein: R is a hydrogen atom or a methyl group; $R_1$ is a hydrocarbon group; M and M' are each a metal atom or ammonium; and n is an integer greater than or equal to 1.

Another type of reactive surfactant that may be suitable for use in the present invention are surfactants having formula (19) below:

X—O—$(R_1O)_n$-A-$SO_3$M (19)

wherein: X is a polymerizable group having C—C double bond; M is a hydrogen atom, a metal, or ammonium; $R_1$ is a hydrocarbon; n is equal to 0 or a number greater than or equal to 1; and A is a group having one of formulae (20), (21), or (22) below:

(20)

(21)

(22)

Reactive surfactants of this type may be produced by a method subjecting a compound having polymerizable C—C double bond of formula (23) below:

X—O—$(R_1O)_n$—H (23)

to an addition reaction with epichlorohydrin and reacting the resultant chlorohydrin substance with a sulfurous acid salt to yield a sulfonic acid salt. One example of such a reactive surfactant has formula (24) below:

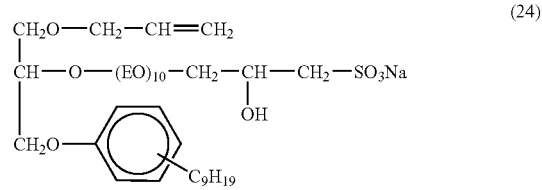
(24)

Another type of reactive surfactant that may be suitable for use in the present invention are surfactants having formula (25) below:

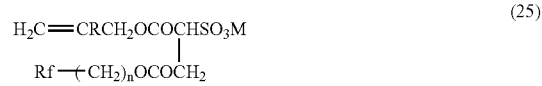
(25)

wherein: R is a hydrogen atom or a methyl group; M is Li, Na, or K; n is a number from 1 to 6; and Rf is a $C_1$-$C_{20}$ fluoroalkyl. An example of one such surfactant is represented by formula (26) below:

(26)

These surfactants may be made by reacting a metallic salt of a succinic acid monoester (e.g., potassium salt of monoallyl sucjiniate) with a fluorine iodide [Rf—(CH$_2$)$_n$—I] to provide a compound represented by formula (27) below:

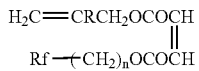 (27)

This compound is then dissolved in a mixed solvent of water with ethanol. A metallic hydrogensulfite (e.g., sodium hydrogensulfite) is subsequently added to yield the reactive surfactant described by formula (25) above. The reactive surfactant is capable of forming a homopolymer of itself or a copolymer thereof with other vinyl monomers.

Another type of reactive surfactant that may be suitable for use in the present invention are surfactants having formula (28) below:

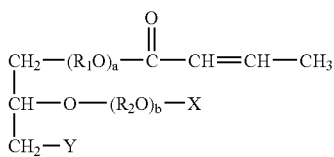 (28)

wherein: $R_1$ and $R_2$ are each a hydrocarbon; X is a hydrogen atom or a hydrophilic functional group; Y is a hydrogen atom, a hydrocarbon, or O—($R_3$—O)$_c$—$R_4$ (wherein $R_3$ is a hydrocarbon, $R_4$ is a hydrocarbon or acyl group, and c is a number from 1 to 1000); and a and b are each a number from 0 to 1000. An example of one such surfactant is represented by formula (29) below:

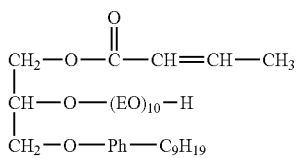 (29)

These surfactants may be obtained from a reaction between nonylphenol glycidyl ether and crotonic acid in the presence of a catalyst (e.g., triethylamine) at 120-130° C.

Another type of reactive surfactant that may be suitable for use in the present invention are surfactants having formula (30) below:

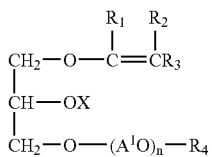 (30)

wherein: $A^1$ is a $C_2$-$C_4$ alkylene; $R_1$ is a hydrogen atom or a methyl group; $R_2$ and $R_3$ are each a hydrogen atom or a $C_1$-$C_4$ hydrocarbon group; $R_4$ is a $C_8$-$C_{24}$ hydrocarbon group or an acyl group; m is a number from 0 to 50; and X is a hydrogen atom or a nonionic, anionic, cationic or amphoteric hydrophilic functional group. In certain embodiments, the X in formula (30) above is a group represented by formula (31) below:

-(A$^2$O)$_n$—H (31)

wherein $A^2$ is a $C_2$-$C_4$ alkylene and n is a number from 1 to 100, or by formula (32) below:

-(A$^3$O)$_p$—SO$_3$M$^1$ (32)

wherein: $A^3$ is a $C_2$-$C_4$ alkylene; p is a number from 0 to 100; and $M^1$ is a hydrogen atom, an alkali metal, an alkaline earth metal, ammonium, or a $C_1$-$C_4$ hydroxyalkylammonium.

Another type of reactive surfactant that may be suitable for use in the present invention are surfactants having formula (33) below:

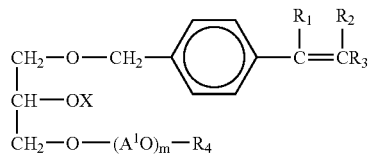 (33)

wherein: $A^1$ is a $C_2$-$C_4$ alkylene; $R_1$ is a hydrogen atom or a methyl group; $R_2$ and $R_3$ are each a hydrogen atom or a $C_1$-$C_4$ hydrocarbon group; $R_4$ is a $C_8$-$C_{24}$ hydrocarbon group or an acyl group; m is a number from 0 to 50; and X is a hydrogen atom or a nonionic, anionic, cationic or amphoteric hydrophilic functional group. In certain embodiments, the X in formula (33) above is a group represented by formula (34) below:

-(A$^2$O)$_n$—H (34)

wherein $A^2$ is a $C_2$-$C_4$ alkylene and n is a number from 1 to 100, or by formula (35) below:

-(A$^3$O)$_p$—SO$_3$M$^1$ (35)

wherein: $A^3$ is a $C_2$-$C_4$ alkylene; p is a number from 0 to 100; and $M^1$ is a hydrogen atom, an alkali metal, an alkaline earth metal, ammonium, or a $C_1$-$C_4$ hydroxyalkylammonium.

Another type of reactive surfactant that may be suitable for use in the present invention are surfactants having formula (36) and/or (37) below:

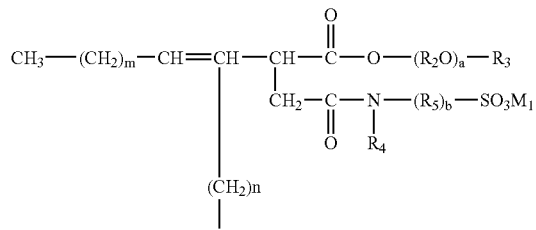 (36)

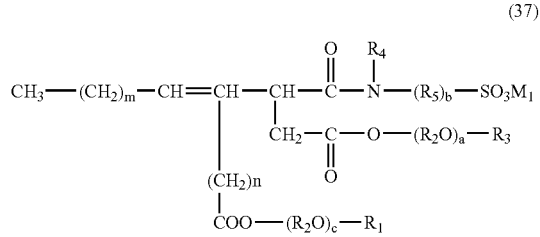 (37)

wherein: $R_1$ represents a hydrogen atom or a low class alkyl; $R_2$ represents a $C_2$-$C_4$ alkylene; $R_3$ represents an allyl or methylol group; $R_4$ represents a hydrogen atom or a low class alkyl; $R_5$ represents a $C_1$-$C_8$ hydrocarbon; m and n each represent a number from 1 to 18; a and c each represent a number from 0 to 5; b is equal to 0.1; and $M_1$ represents an alkali metal. These surfactants may be made by reacting maleic methyl oleate with allyl alcohol to prepare maleic methyl monoallyl. N-methyl taurine soda is then added therein to carry out dehydrating condensation to prepare a reactive surfactant represented by the formula (36) and/or (37) above.

Another type of reactive surfactant that may be suitable for use in the present invention are surfactants having one or more of formulae (38), (39), (40), or (41) below:

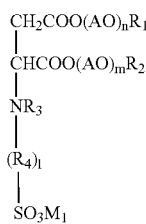

(38)

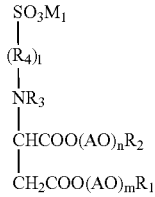

(39)

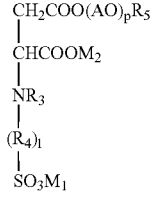

(40)

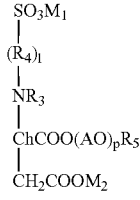

(41)

wherein: $R_1$ is a hydrocarbon group; $R_2$ is a hydrocarbon group having an allyl or methacrylic group; A is a $C_2$-$C_4$ alkylene group; m, n, and p are each a real number from 0 to 100; $R_3$ is a hydrogen atom or a low class alkyl group; I is equal to 0 or 1; $R_4$ is a $C_1$-$C_8$ alkylene group or a phenylene group; $R_5$ is a hydrocarbon group having an allyl group or a methacrylic group; and $M_1$ and $M_2$ are each a metal or an amine.

Another type of reactive surfactant that may be suitable for use in the present invention are surfactants having formula (42) below:

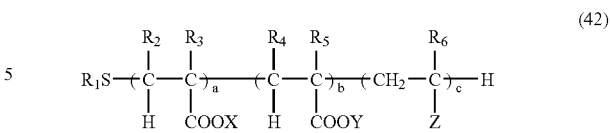

(42)

wherein: $R_1$ is a $C_6$-$C_{18}$ alkyl group; $R_2$, $R_3$, $R_4$, $R_5$, and $R_6$ are each a hydrogen atom, a methyl group; a carboxymethyl group; or a carboxyl group; X is a hydrogen atom, an ammonium group, an amine base, an alkali metal, or an alkaline earth metal; Y is a hydrocarbon group having a polymerizable unsaturated group; Z is a nitrile group, a phenyl group, an amide group, or an alkyl carboxylate group; a is an integer from 1 to 500; b is an integer from 1 to 100; and c is equal to 0 or is an integer from 1 to 250.

Another type of reactive surfactant that may be suitable for use in the present invention are surfactants having formula (43) below:

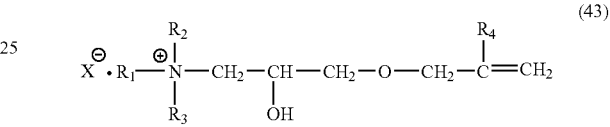

(43)

wherein: $R_1$ is a $C_8$-$C_{22}$ hydrocarbon (which may have one or more substituent groups); $R_2$ and $R_3$ are each a $C_1$-$C_3$ alkyl group; $R_4$ is a hydrogen atom or a methyl group; and X is a monovalent anion. An example of one such reactive surfactant is 3-allyloxy-2-hydroxypropyldimethylstearylammonium chloride.

Another type of reactive surfactant that may be suitable for use in the present invention are surfactants having formula (44) and/or (45) below:

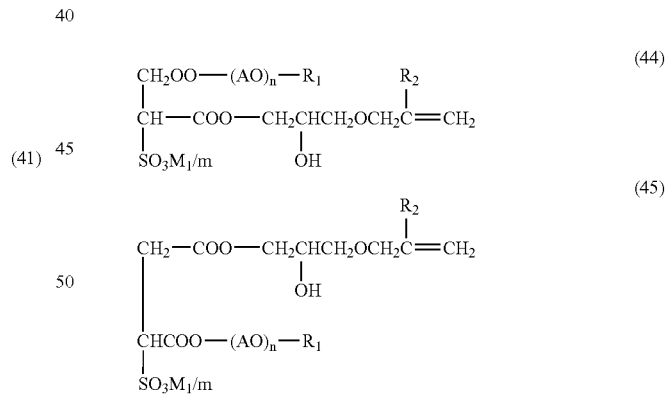

(44)

(45)

wherein: $R_1$ is a hydrocarbon, phenyl, amino or carboxylic acid residue; $R_2$ is a hydrogen atom or a methyl group; A is a $C_2$-$C_4$ alkylene; n is a positive integer from 1 to 100; $M_1$ is a monovalent or bivalent cation; and m is the ionic valency of $M_1$. An example of one such reactive surfactant is sodium lauryl 2-hydroxy-3-allyloxy-1-propyl sulfosuccinate.

Examples of commercially-available reactive surfactants include the Hitenol™ and Noigen™ line of reactive surfactants available from Dai-Ichi Kogyo Seiyaku Co., Ltd. of Japan, the Maxemul™ line of reactive surfactants available from Uniqema of The Netherlands, and the Polystep™ RA series of reactive surfactants available from Stepan Co. of Northfield, Ill.

Further examples of reactive surfactants that may be suitable for use in the present invention are described in the following U.S. patents, the relevant disclosures of which are herein incorporated by reference: U.S. Pat. Nos. 6,841,655; 6,649,718; 6,534,597; 6,506,804; 6,242,526; 6,239,240; 5,478,883; 5,332,854; 5,324,862; 5,206,286; 4,918,211; 4,814,514; 4,611,087; 4,426,489; 4,337,185; 4,246,387; 4,224,455; 4,075,411; and 3,541,138. Further examples of suitable reactive surfactants are described in the following U.S. patent applications, the relevant disclosures of which are herein incorporated by reference: U.S. Patent Application Publication Nos. 2005/0070679; 2004/0242447; 2004/0197357; 2004/0048963; and 2003/0181574.

Examples of commercially-available reactive surfactants include the Hitenol™ and Noigen™ line of reactive surfactants available from Dai-Ichi Kogyo Seiyaku Co., Ltd. of Japan, the Maxemul™ line of reactive surfactants available from Uniqema of The Netherlands, and the Polystep™ RA series of reactive surfactants available from Stepan Co. of Northfield, Ill.

The reactive surfactant may be present in any amount that does not adversely affect the subterranean formation being treated, the proppant particulate being treated, and/or the properties or components of any fluid used in conjunction with the present invention (e.g., by forming a gel that is too viscous to pump). In certain embodiments, the reactive surfactant may be present in a treatment fluid used in the present invention in an amount in the range of from about 0.01% to about 10% by volume of the treatment fluid. In certain embodiments, the reactive surfactant may be present in a treatment fluid used in the present invention in an amount in the range of from about 1% to about 5% by volume of the treatment fluid.

In certain embodiments, the reactive surfactant may perform one or more additional functions prior to interacting with the surface being treated, including, but not limited to, stabilizing a foam or emulsion, changing the wettability of a surface, solubilizing certain materials, dewatering a fluid, increasing the viscosity of a fluid, reducing the surface tension of a fluid, enhancing viscoelastic or rheological properties of a fluid, stabilizing a film or coating on a surface, and/or aiding in the placement of a treatment fluid in a subterranean formation. In certain embodiments, after interacting with the surface being treated, the reactive surfactant may be capable of interacting with some other substance introduced to the surface of the particulate (e.g., a resin or tackifying agent subsequently introduced into the subterranean formation). In those embodiments, the reactive surfactant may, inter alia, "disappear" from the surface being treated or become adsorbed into the surface and/or into a coating on that surface, which may impart the functionality of the surfactant (e.g., reactivity, curability, spreadability, wettability, hydrophobicity, or hydrophilicity) to the surface and/or any coating residing thereon.

In certain embodiments of the present invention, a resin and/or tackifying agent optionally may be allowed to interact with the surface being treated, among other purposes, to help consolidate and/or stabilize unconsolidated particulates, modify the hydrophobicity or hydrophilicity of the surface of the particulate, and/or maintain the conductivity of a subterranean formation, gravel pack, and/or proppant pack. The optional resin or tackifying agent may be provided as a component of a treatment fluid to be introduced into a subterranean formation, or it may be pre-applied to a proppant particulate (e.g., a surfactant-treated proppant particulate of the present invention). The optional resin or tackifying agent may comprise any such substance known and suitable for use in subterranean operations. Suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins (and hybrids and copolymers thereof), acrylate resins, and mixtures thereof. Suitable tackifying agents may include, but are not limited to, include non-aqueous tackifying agents, aqueous tackifying agents, silyl-modified polyamides, aqueous and non-aqueous gelable polymer compositions, and mixtures thereof. The application of the optional resin or tackifying agent may further require the application of one or more preflush fluids, afterflush fluids, catalysts, or other additives, among other purposes, to prepare a surface of a particulate for placement of the resin or tackifying agent and/or to activate the resin or tackifying agent. The optional resin or tackifying agent may be provided prior to, during, or subsequent to any portion of a method of the present invention, and may be provided as a component of a treatment fluid comprising the reactive surfactant and/or in a separate treatment fluid. A person skilled in the art, with the benefit of this disclosure, will recognize when the use of an optional resin or tackifying agent is appropriate for a particular application of the present invention, as well as the type of resin or tackifying agent to use and the appropriate method of applying that resin or tackifying agent to a particulate and/or subterranean formation. In those embodiments where an optional resin or tackifying agent is used, the reactive surfactant may, inter alia, aid in the placement of the resin or tackifying agent, activate the resin or tackifying agent, and/or become adsorbed into a coating formed on the surface being treated by the resin or tackifying agent.

Proppant particulates suitable for the present invention, including the surfactant-treated proppant particulates of the present invention, may comprise any particulate suitable for use in subterranean operations. It should be understood that the term "proppant particulate," as used herein, includes all known shapes of materials including substantially spherical materials, fibrous materials, polygonal materials (e.g., cubic materials), and mixtures thereof. Suitable proppant particulates include, but are not limited to, sand, bauxite, ceramic materials, glass materials (e.g., glass beads), polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. The proppant particulates may have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh.

The treatment fluids of the present invention generally comprise a base fluid and a reactive surfactant and/or a surfactant-treated proppant particulate of the present invention. The base fluid may comprise any fluid suitable for use in subterranean operations that does not contain compounds that adversely affect other components of the treatment fluid. The base fluid used in the treatment fluids of the present invention may be aqueous-based, non-aqueous-based, or a combination thereof. Where the base fluid is aqueous-based, it may comprise fresh water, salt water (e.g., water containing one or more salts dissolved therein), a brine, seawater, or a combination thereof. Where the base fluid is non-aqueous-based, the base fluid may comprise any number of organic liquids. Examples of suitable organic liquids include, but are not limited to, mineral oils, synthetic oils, esters, and the like.

The treatment fluids of the present invention optionally may comprise any number of additional additives, including, but not limited to, salts, additional surfactants, acids, fluid loss control additives, gas, foamers, emulsifiers, demulsifiers, defoamers, antifoamers, corrosion inhibitors, scale inhibitors, catalysts, clay control agents, biocides, friction reducers, bridging agents, dispersants, flocculants, $H_2S$ scavengers, $CO_2$ scavengers, oxygen scavengers, lubricants, viscosifiers, breakers, pH adjusting agents, weighting agents, relative permeability modifiers, resins, tackifying agents, particulate materials (e.g., proppant particulates), wetting agents, coating enhancement agents, and the like. A person skilled in the art, with the benefit of this disclosure, will recognize the types of additives that may be included in the treatment fluid for a particular application depending upon, among other factors, the type of reactive surfactant used, the composition of the treatment fluid, the composition of the subterranean formation and/or particulates being treated, and the like.

The methods of the present invention generally comprise the use of a reactive surfactant to treat surfaces within a subterranean formation (e.g., formation fines, proppant particulates, fractures faces, propped fracture faces or well bore walls) or proppant particulates for use in a treatment fluid, and/or the use of a proppant particulate that has been treated with a reactive surfactant.

In certain embodiments, the methods of the present invention comprise: providing a treatment fluid of the present invention that comprises a base fluid and a reactive surfactant; introducing the treatment fluid into a subterranean formation; and allowing the reactive surfactant to interact with a surface residing within the subterranean formation. In these embodiments, the surface residing within the subterranean formation may comprise, among other things, a fracture face, a propped fracture face, a well bore wall, a surface of sand particulates, gravel particulates, fines, proppant particulates placed in the subterranean formation (e.g., during the course of a hydraulic fracturing treatment), or any other type of particulates found within the subterranean formation. In these embodiments, the treatment fluid comprising the reactive surfactant may comprise a low-viscosity (e.g., lightly gelled or not gelled) aqueous solution, which may be injected into the subterranean formation by any means known in the art (e.g., through the tubing, casing, wellbore, coiled tubing, annulus, jetting, acoustical pulsing, etc.).

In certain embodiments, the methods of the present invention comprise: providing a treatment fluid of the present invention that comprises a base fluid and a proppant particulate of the present invention that comprises at least one surface that has been allowed to interact with a reactive surfactant; and introducing the treatment fluid into a subterranean formation. In certain embodiments, at least some portion of the reactive surfactant may reside on a surface of a proppant particulate of the present invention. The proppant particulate of the present invention may be deposited in the subterranean formation, among other purposes, to form a portion of a gravel pack and/or to hold open conductive channels or fractures within the subterranean formation (e.g., forming a "proppant pack" within a subterranean fracture). In certain embodiments, the treatment fluid may be introduced into the subterranean formation at or above a pressure sufficient to create or enhance one or more fractures within the subterranean formation wherein the proppant particulates of the present invention may be deposited. "Enhancing" one or more fractures in a subterranean formation may include the extension or enlargement of one or more natural or previously created fractures in the subterranean formation.

In certain embodiments, the methods of the present invention comprise: providing a proppant particulate; providing a reactive surfactant; and allowing the reactive surfactant to interact with a surface of the proppant particulate. The reactive surfactant may be allowed to interact with the surface of the proppant particulate in any suitable manner known in the art. For example, the reactive surfactant and proppant particulate may be mixed together in a treatment fluid and allowed to interact therein. These components may be mixed together in a treatment fluid prior to, during (e.g., "on the fly"), or subsequent to introducing one or more of those components into a subterranean formation and/or a well bore penetrating that subterranean formation. In certain embodiments, allowing the reactive surfactant to interact with the surface of the proppant particulate may result in some portion of the reactive surfactant becoming attached to the surface of the proppant particulate and/or becoming adsorbed into the surface of the particulate (or a coating thereon). A proppant particulate treated using these methods of the present invention then may be used in a variety of subterranean operations, including, but not limited to, hydraulic fracturing operations.

The reactive surfactants used in the methods of the present invention may be used in or in conjunction with numerous subterranean treatments, including but not limited to proppant fracturing, gravel packing, "frac-packing," screened completions, screenless completions, drilling fluids, acidizing (e.g., matrix acidizing or fracture acidizing), conformance treatments (e.g., water control, relative permeability modifiers, etc), other sand control applications (e.g., formation consolidation, near wellbore consolidation, etc.), fluid loss "pills", scale treatments, hydrate control treatments, and the like.

Therefore, the present invention is well adapted to attain the ends and advantages mentioned as well as those that are inherent therein. While numerous changes may be made by those skilled in the art, such changes are encompassed within the spirit of this invention as defined by the appended claims. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the appended claims have their plain, ordinary meaning unless otherwise explicitly and clearly defined by the patentee.

What is claimed is:

1. A method comprising:
providing a treatment fluid that comprises a base fluid and a reactive surfactant;
introducing the treatment fluid into a subterranean formation; and
allowing the reactive surfactant to interact with a surface in the subterranean formation, wherein the reactive surfactant performs at least one function selected from the group consisting of: forming a coating on the surface, becoming absorbed onto the surface, modifying the hydrophobicity of the surface, modifying the hydrophilicity of the surface, and providing a reactive site.

2. The method of claim 1 wherein the reactive surfactant is selected from the group consisting of diallyl amine pluronics, linoieic alcohols, allyl alkyl phenols, acrylate derivatives, allyl alcohol alkenyl anhydride derivatives, maleic derivatives, sulfosuccinate derivatives, allyl amine salts, derivatives thereof, and combinations thereof.

3. The method of claim 1 wherein the reactive surfactant is present in an amount in the range of from about 1% to about 5% by volume of the treatment fluid.

4. The method of claim 1 wherein the surface residing within the subterranean formation is a surface of a proppant particulate.

5. The method of claim 1 further comprising:
providing a resin and/or tackifying agent;
introducing the resin and/or tackifying agent into the subterranean formation; and
allowing the resin and/or tackifying agent to interact with a surface in the subterranean formation.

6. The method of claim 5 wherein the resin is selected from the group consisting of two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, derivatives thereof and combinations thereof.

7. The method of claim 5 wherein the tackifying agent is selected from the group consisting of non-aqueous tackifying agents, aqueous tackifying agents, silyl-modified polyamides, aqueous gelable polymer compositions, non-aqueous gelable polymer compositions, derivatives thereof and combinations thereof.

8. The method of claim 1 wherein the treatment fluid further comprises an additive selected from the group consisting of salts, surfactants, acids, fluid loss control additives, gas, foamers, emulsifiers, demulsifiers, defoamers, antifoamers, corrosion inhibitors, scale inhibitors, catalysts, clay control agents, biocides, friction reducers, bridging agents, dispersants, flocculants, $H_2S$ scavengers, $CO_2$ scavengers, oxygen scavengers, lubricants, viscosifiers, breakers, pH adjusting agents, weighting agents, relative permeability modifiers, wetting agents, coating enhancement agents, and combinations thereof.

* * * * *